June 22, 1965  F. MAYER  3,191,132
ELECTRIC CABLE UTILIZING LOSSY MATERIAL
TO ABSORB HIGH FREQUENCY WAVES
Filed Jan. 10, 1963  3 Sheets-Sheet 1
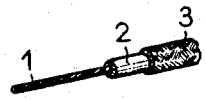
FIG.1
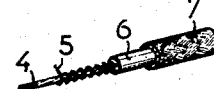
FIG.2
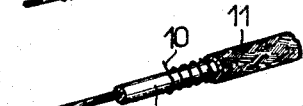
FIG.3
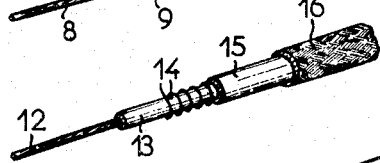
FIG.4
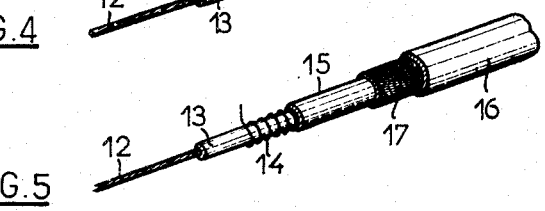
FIG.5
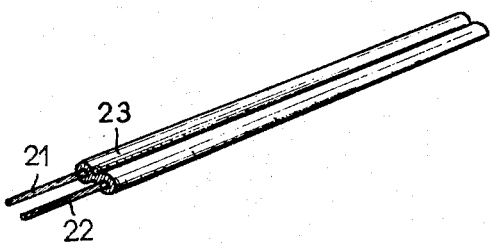
FIG.6
FIG.7
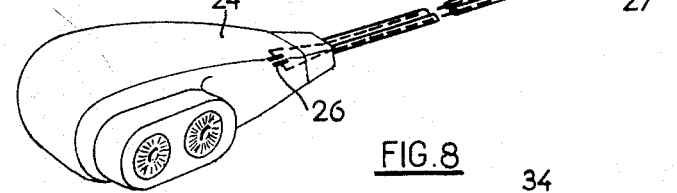
FIG.8
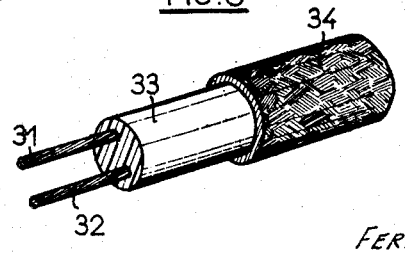
INVENTOR
FERDY MAYER
BY Irwin S. Thompson
ATTY.

3,191,132
ELECTRIC CABLE UTILIZING LOSSY MATERIAL TO ABSORB HIGH FREQUENCY WAVES
Ferdy Mayer, 4 Ave. de Beauvert, Grenoble, France
Filed Jan. 10, 1963, Ser. No. 250,674
15 Claims. (Cl. 333—79)

The present invention which is a continuation-in-part of my application Serial No. 801,554, filed March 24, 1959, relates in a general manner to the protection of radio-electric equipment or installations against parasitic radiation emanating from innumerable sources of the most varied nature: ignition circuits of internal combustion engines, commutator motors, and all other apparatus which are liable to produce electric sparks.

It is well known that any protection against these parasitic radiations must be made at their actual source, and various means have already been proposed to this end. These known means can be divided into two classes: (a) Anti-parasite circuits with localised elements (blocking inductances, by-pass condensers, resistances) which form filters tending to permit the passage of the range of frequencies required for the correct operation of the apparatus, while absorbing the high frequencies which would interfere with radio-electric reception; (b) The so-called anti-parasite cables used mainly in the ignition circuits of automobile vehicles and comprising a core of high resistance, having a practically uniform effect at all frequencies.

The development of television and radio-diffusion by frequency modulation, using the frequency band of 50 to 250 megacycles has seriously aggravated the difficulties of the problem of suppression of parasitic radiation. In effect, whether it is a question of the bundle of ignition cables forming the connection between the distributor and the spark plugs of an automobile engine, or of the mains-connection cable of an electric razor or other domestic apparatus, the length of these cables is of the order of the length of the wavelength of the useful signals, and in consequence this favours the radiation of the interfering portion of the frequency spectrum of the sparks. The application of anti-parasite circuits with localised elements becomes however difficult, if not totally inoperative, at frequencies of this high order; the known filters based on systems having distributed constants are also inoperative by reason of the high degree of attenuation which becomes necessary; shielded cables could provide protection, but their use is practically impossible in the greater part of the applications considered, especially in the ignition circuits of vehicles. It is for this reason that in recent times, in connection with ignition circuits of vehicles in particular, all the anti-parasite systems have been based on the use of resistance wire.

Now, this technique has a number of serious drawbacks. In order to obtain an adequate effect of absorption the resistance must be high (several thousand ohms) which makes it necessary to use a very fine metal wire, which is thus very fragile mechanically, or of a ribbon covered with a non-metallic resistant layer, which is awkward to apply, or again of mixtures of powders which are bad conductors (carbon for example) in a plastic support such as rubber, which is very sensitive to temperature. In addition to the drawbacks inherent in each of these solutions, there remains for all cables comprising resistance wire, the disadvantage of absorbing as many of the low-frequency components as those of high-frequency, the skin effect being practically negligible. While this drawback prohibits the use of cables of resistance wire in the case of domestic apparatus, or all other applications in which the cable is required to convey energy, it is also a source of trouble in the ignition circuits in which up to the present time it has been tolerated for want of something better: the resistance which is offered to the low-frequency components also deadens the spark and adversely affects the quality of the ignition. The petrol consumption increases, the plugs become fouled more quickly, and the liveliness of the engine is lost.

The present invention has for its object the production of an anti-parasite cable adapted to avoid at once these various drawbacks, while offering all the qualities of a normal cable over a range of useful frequencies, and a sufficient absorbent effect over a further range of frequencies to be protected. In other words, the invention is directed to the production of a cable which offers the essential properties of a filter from the point of view of the desired effect of protection, whilst at the same time retaining the qualities, the simplicity, the robustness and even the appearance of a usual type of cable for everything which concerns the transmission of energy over a band of useful frequencies, which will in general be located below a certain lower limit, which lower limit may furthermore vary according to the applications.

Acording to the invention, these results are obtained by following a course which fundamentally diverges from anything which has been attempted up to the present time in connection with protection against parasitic radiations. It may in fact be observed that in the prior technique, whether it were a matter of producing selective action by filtering or by short-circuits (by-passes) by the effect of reactances or of absorption effects by the Joule theorem, it was always the path or medium of ciculation of the electric current, that is to say the conductive element of the cable, which was employed. The present invention on the contrary consists in the use, not of the circulation medium or conductive element of the cable, but the surrounding medium in which the said conductive element is immersed and in which acts the electromagnetic field which accompanies the flow of current, producing a condition in at least a part of this surrounding medium in such manner as to cause therein substantial losses in the band of frequencies which it is desired to attenuate.

The conditioning of the surrounding medium, which is in principle a substance having an insulating base, will be effected, in other words, in such manner as to confer on this medium a substantial figure of loss within a given range of frequencies. These losses may either be dielectric losses caused by suitable impurities incorporated in the insulating substance or a suitable choice of the dielectric, or they may be magnetic losses produced by a zone of ferro- or ferri-magnetic material of appropriate texture, or again they may comprise a combination of these two kinds of losses. In both cases, as is well known, the losses may be attributed to the fact that electric or magnetic doublets become driven in an oscillatory movement by the alternating electro-magnetic field and to the friction which tends to prevent these movements (wall resonance; Debye relaxation). Depending on the texture of the electric or magnetic doublets, a resonance effect may be found at one or a number of frequencies, each resonance resulting in bringing the absorption effect to a maximum value. The nature and/or the texture of the doublets will be chosen, according to the invention, in such manner that their natural frequency or frequencies are located in the range of frequencies to be attenuated, or at least in the vicinity of the said range.

The cable of this invention is based on the principle of frequency dependent absorption due to several microscopic relaxation and resonance effects.

Such effects in magnetic material are described in "Les Applications Modernes Des Ferrites" (M. F. Mayer), Revue Generale de l'Electricite, June 1957, at page 355.

Below are described the absorption effects, as well as the necessary technology and the manner of predetermining such effects. Then there will be shown by a mathematical analysis the essential feature of the invention, which is that the absorption effect must be as large as or larger than the reactive effect. Finally, the same concept is applied by means of dielectrics.

It is known that all ferromagnetics are constituted by elemental "domains" which are spontaneously magnetized at saturation. Between adjacent domains, there is a definite variation of the vector magnetization, which depends only on the intrinsic anisotropy of the material, strain and shape anisotropy being neglected. The domains are separated by limits, called Bloch walls (90° walls or 180° walls); the magnetic flux lines form essentially closed paths in the crystal, thereby keeping it in a state of minimum potential energy. The crystal has no external magnetic fields, except of minute leakage fields at the ends of domain walls. Use of these external field domains is made to obtain "Bitter patterns," by a finely ground magnetic powder, which shows the limits or walls. The transition between different domains is gradual; the spins vary gradually from one side of the wall to the other; that means that the domain walls have a finite thickness.

"Bitter patterns" derive their name from that of the person credited with first devising a means for producing them and involve the placing of an extremely fine powder of magnetic material on a slice of the material under investigation. The magnetic field leakage from the ends of domain walls causes the particles of powder to form a pattern which is analogous to that formed by iron filings when placed on a sheet in the vicinity of a magnet and which can be examined through a miscroscope to determine the dimensions of the domain walls.

This thickness is determined by the equilibrium of two contrary forces:

(a) The exchange energy, constituted for the most important part by the interaction of adjacent spins, orientated in opposite directions, and (b) By the anisotropy energy due to the fact that a crystal requires different magnetizing forces for different directions of magnetization (in particular, a direction of difficult magnetization, and another of easy magnetization).

If such a material is magnetized (1) The Bloch walls move themselves in the way to increase the volume of the domains which were in the favorable direction (i.e., near the direction of easy magnetization) in the direction of the applied magnetic field.

(2) The magnetic vectors (spins) tend to orient themselves in the direction of the field.

Then, two processes, wall movement and spin rotation, represent the permeability of the material.

Consider now the variation of the initial permeability that describes the operation of the two processes when a small external alternating field is applied:

$$\mu^* = \mu' - j\mu''$$

where the first term describes the facility of magnetization equivalent to the well known permeability and an imaginary term describes the losses due to the "frictions" of the wall displacements and the spin rotations. One can show that at low frequencies, when the frictions are negligible $$\mu'' = 0$$

$$\mu' = 1 + 4\pi M_s^2 \left(\frac{1}{\alpha d} + \frac{2}{3M_s H_e}\right)$$

where $\alpha$ is the "rigidity" of the walls $d$ the dimensions of the walls $M_s$ the saturation magnetization and $H_e$ the effective internal field of the domain, which describes the crystalline anisotropy, and which varies between $H_{anis}$ and $H_{anis+4\pi M_s}$ depending on the shape of the domain (demagnetization factor).

$H_{anis}$.—The equivalent anisotropy field, equal to $4K_1/3M_s$ where $K_1$ is the first order anisotropy constant.

so we can see that the first term of the $\mu'$ relation represents the contribution of the domain wall. The greater the permeability the more rigid are the walls and the smaller the domains. The second term represents the contribution of the spin rotation.

When now, the external field increases in frequency, there is obtained due to the mass and the elastic forces: resonances or relaxations in the $\mu'$ spectra when the friction losses are low or high respectively, and we obtain, due to the frictions, maxima of absorptions in the $\mu''$ spectra. The frequencies, when these maxima occur, are in the 1 to 100 megacycle range. In FIG. 12, according to one embodiment of the present invention, $\omega_1$ may be in the 1–100 mc. range and $\omega_2$ in the 10–1000 mc. range.

The resonant frequency due to the wall movement, $\omega_1$ is given by $$\omega_1 = \gamma (8\pi\alpha)^{1/2} \cdot \left(\frac{A}{K}\right)^{1/4}$$

where $\gamma$ is the gyromagnetic factor and $A$ the exchange energy per unit volume. The resonant frequency for pure domain rotation is given by $$\omega_2 = \gamma H_e = \frac{8\pi\gamma M_s}{3(\mu'_0 - 1)}$$

where $\mu'_0$ is the low frequency permeability; at very high frequencies, both losses decay (in absence of all external permanent field, which would be superposed on $H_e$) and decreases towards 0, above the maximum value of $H_e$:

$$\omega_{Limit} = \gamma (H_e)_{max} = \gamma (H_{anis} + 4\pi M_s)$$

Above this frequency there are no more magnetic losses.

Given the relations set forth above, it is a relatively simple matter to select starting materials whose properties are in the ranges required to permit the production of compositions having the desired characteristics. Such selection can be made on the basis of the numerous currently available characteristic curves which illustrate the various basic properties of most known dielectric and magnetic materials. These curves, or superpositions of several of them (for several materials to be combined) indicate the values for the various basic characteristics ($\alpha$, $d$, $M_s$, $H_e$, etc.) of these materials. Although, in the case of a combination of materials, these characteristics generally represent a simple addition of the individual characteristics, it often happens that the combinations exhibit additional effects due to the mixture itself, e.g., losses of the Maxwell-Wagner type (which will be mentioned in detail later in this specification). Once these characteristics are determined, one has only to chose those materials capable of yielding those values of $\mu'$ and $\mu''$, or $\epsilon'$ and $\epsilon''$ required for the particular frequency rang of interest. In any case, once the relations and criteria set forth above are known, one skilled in the art would be capable of determining, from such characteristic curves, which currently available materials, or combinations thereof could be used to produce the compositions according to the present invention.

In accordance with the invention, a deliberate choice of the above described relaxations and resonances is made to place the absorption into a certain frequency range. It can therefore be said, not that the attenuation rises with frequency but that the losses rise and decrease with the frequency. The following is a more detailed description deduced from the above relations: For placing $\omega_1$ in the desired frequency range, the factors $\alpha$ and $d$ of the structure of the domains are determined, by action on the composition of the material and the thermal treatments. There can be obtained large domains by a slow decay of temperature at the end of the heat treatment.

The factor $M_s$ can be determined by the chemical composition and the granular structure so that there can be obtained low $M_s$ by adding non-magnetic ions like aluminum in the crystalline structure or by obtaining low densities by sintering at low temperatures, or by mixing the grains with non-magnetic supports. The factor $H_e$ can be determined by changing the anisotropy, through chemical composition, i.e., by adding a small amount of cobalt. After this "technology" for the engineering of the cables of this invention, there will be developed the necessary of doing this, and now there appears yet another characteristic effect of this invention.

Taking into consideration a single four terminal circuit (FIG. 13):

L represents the self-inductance of the wire (or the coil) without any magnetic material; $\mu^* = \mu' - j\mu''$ reprents the characteristics of the magnetic medium, $r$ represents all losses of the wire (or the coil) not due to the magnetic medium. The amplitude and phase at the output depends directly on the variation of the series impedance of the upper branch.

$$Z_{\text{series}} = r + j(\mu' - j\mu'')\omega L$$
$$= (r + \mu''\omega L) + (j\mu'\omega L)$$

The total attenuation so obtained, is proportional to $\mu'$ and $\mu''$; that means that the attenuation will be the greater, the greater is $\mu'$. However, as can be seen from FIG. 12, the value of $\mu'$ decreases rapidly at the higher frequencies so that the total attenuation at these frequencies would tend to decrease. In accordance with this invention, regardless of the value of $\mu'$ at any desired frequency or range or frequencies, if the value of $\mu''$ is made at least equal to $\mu'$, the desired attenuation effect will be produced. This can be easily demonstrated, considering the quality factor $Q$ of the above series impedance.

$$Q = \frac{\text{reactance}}{\text{resistance}} = \frac{\mu'\omega L}{r + \mu''\omega L}$$
$$= \frac{\mu'}{\frac{r}{\omega L} + \mu''} = \frac{\mu'}{\frac{1}{Q_0} + \mu''}$$

where $Q_0$ is the Q-factor, without the magnetic medium, and which is considerably greater than unity, so that we have approximately $$Q \cong \frac{\mu'}{\mu''}$$

It can, therefore, be seen that for magnetic absorption, the ratio of the real part to the imaginary part of the permeability gives the quality factor, or "overvoltage factor."

For all ferromagnetics, this ratio is higher than unity for frequencies below $\omega_1$ (i.e., under 20 megacycles for Ferroxcube IV C, a Ni–Zn ferrite, rich in Zn, and under 100 megacycles for Ferroxcube IV E, pure Ni ferrite). That means that the biggest part of energy is stored as reactive energy in the attenuating cable instead of being dissipated into heat—and this instead of absorbing, can produce radiation and "amplification." It is essential to this invention to shape the curves of $\mu'$ and $\mu''$, by starting from the above "design equations," to get in the desired range $Q \leq 1$; in other words, $\mu' \leq \mu''$. Then, and only then, the attenuation we get is essentially an "absorption," in the sense that at the desired high frequency, the energy is dissipated into heat.

In addition to the reactive effect (for $(Q>1)$) there appears a phase lag $\varphi$:

$$\varphi = \tan^{-1}\frac{1}{Q}$$

between input and output which can be quite great. All these effects cannot be tolerated for an anti-interference cable; this problem is solved by shaping the $\mu'$ and $\mu''$ curve as shown above, and by increasing the additional term $$\frac{r}{\omega L}$$

by:

(1) Using a large resistor $r$ for the wire or the coil;
(2) Using a wire with high skin effect (magnetic wire with $\mu'$ high);
(3) Using a magnetic wire with high internal absorption ($\mu''/\mu'$ high);
(4) Adding localized or distributed capacities in "shunt";
(5) Adding a "conduction" current in the insulating medium;
(6) Adding dielectric losses, $\epsilon''$, with $\epsilon'$ as great as possible and $\epsilon''/\epsilon'$ greater than unity. (The same considerations as above are valid.) All these ways permit the attainment of a $Q \leq 1$ in all the usable frequency range, and having only absorption effects.

To illustrate this, some results, on a car ignition cable are given below:

$Q \leq 1$ for all frequencies between 1 and 1000 mc.

Time delay for 1 meter of the cable (with a pulse having a rise time $\leq 10$ millimicroseconds) of the order of 10 millimicroseconds, really negligible An equivalent series resistance $(r+\mu''\omega L)$ equal to:

3000 Ω/m. at 3 mc.
10,000 Ω/m. at 30 mc.
100,000 Ω/m. over 100 mc.

The angle of losses of a magnetic material as hereinafter referred to, is the angle $\delta$ which is defined as $$\tan^{-1}\delta = \frac{\mu''}{\mu'}$$

In the same manner as developed above the angle of losses of a dielectric material or mixtures thereof can be defined as $$\tan^{-1}\delta = \frac{\epsilon''}{\epsilon'}$$

The dielectric constant $\epsilon$ of a material is complex and of the form $\epsilon' - j\epsilon''$, where $\epsilon'$ is the real part and $\epsilon''$ is the complex part and is the result of contributions of three molecular mechanisms:

(1) Electronic and atomic polarization
(2) Orientation of permanent dipoles
(3) Ionic or electronic conduction.

The first of these contributes no loss, but the contribution of the other two mechanisms is frequency dependent and effects the dielectric constant.

The invention may thus also be interpreted as consisting in a loading of the surrounding medium of the conductive element of a cable by a material which is arranged, in a manner known per se, in polarized microscopic zones which form resonators in an alternating electro-magnetic field.

The possibilities of application of the invention are very numerous: the description of a few examples of embodiment will enable these possibilities to be more clearly understood.

In the accompanying drawings:

FIGS. 1 to 5 show various examples of cables with a single conductor;

FIGS. 6 to 8 show examples of two-core cables;

The cable shown in FIG. 1 comprises a conductor 1 formed in the usual manner by a copper wire of multiple strands of $\%_{10}$ mm. a sheath 2 having a diameter of 5 mm. and an outer sheath 3 of textile fabric.

The sheath 2 is made from a material having the following composition:

Composition No. 1

| | Percent |
|---|---|
| Neoprene | 68 |
| Stabiliser (bisulphide) | 2 |
| Carbon black | 20 |
| Bakelite | 10 |

A composition of this kind has an angle of dielectric losses $$\tan^{-1}\delta = \frac{\epsilon''}{\epsilon'}$$

which increases with the frequency, for instance up to 1000 mc.; this is a well-known property of natural or artificial rubbers such as neoprene, and also of Bakelite. The addition of carbon powder acts in the same sense and has no practical effect on the conductivity.

Figure 10:
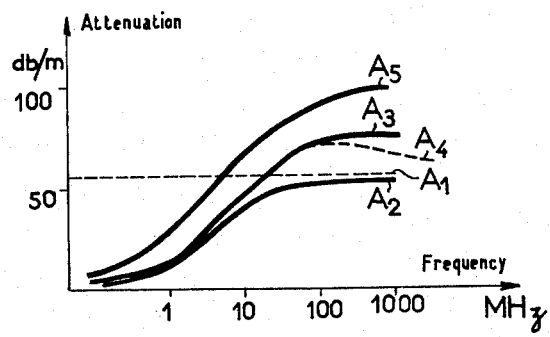
FIGS. 10 and 11 are diagrams showing characteristic curves of cables in accordance with the invention, over a wide band in the megacycle range as shown in these diagrams.

With a cable thus constituted, there is obtained a curve of attenuation as a function of the frequency which has the shape indicated at $A_2$ in FIG. 10, while the horizontal line $A_1$ corresponds to a commercial anti-parasite wire having a resistance of 10,000 ohms per metre. It can be seen that for frequencies greater than 10 megacycles, attenuations are obtained which are comparable, whilst at the same time retaining the advantage of a practically negligible resistance at industrial frequencies.

The attenuations which have been referred to in connection with FIG. 10, and also those which will be referred to below, have been measured by closing the cable on an impedance substantially equal to its characteristic impedance, both on the generator side and on the load side. The value of impedance generally adapted for these measurements was 150 ohms.

It is of course possible to vary the composition employed indefinitely so as to form, according to the invention, an insulating sheath which has a substantial angle of losses at frequencies exceeding a given frequency or in a given range of frequencies. The effect obtained with the composition No. 1 above is still more marked for certain mixtures of polyvinyl chlorides (Geon for example), certain cyclic rubbers and waxes, etc.

In accordance with an alternative form of embodiment, the sheath 2 has the following composition:

Composition No. 2

| | Percent |
|---|---|
| Rubber | 15 |
| Carbon | 5 |
| Ferrite, "Ferroxcube (nickel-zinc)" | 80 |

Figure 11:
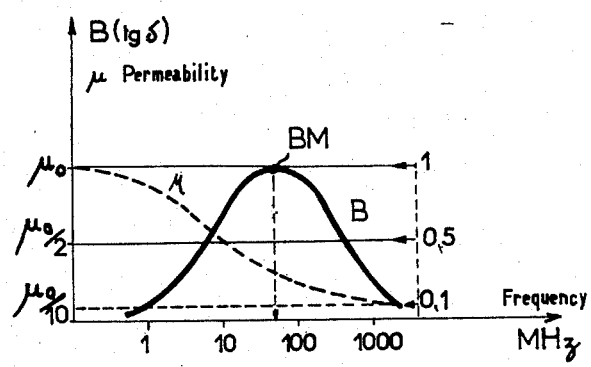
Figure 12:
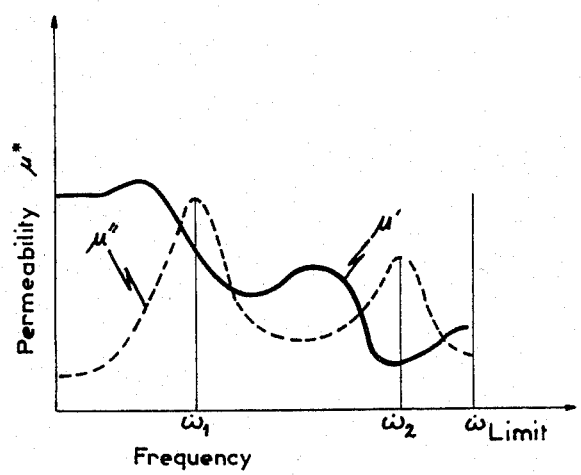
FIG. 12 shows curves of the variations in the permeability factors of a ferrite relative to frequency.
Figure 13:
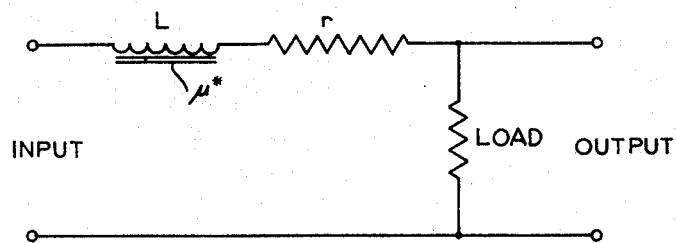
FIG. 13 is a schematic of a circuit used in explaining a principle of this invention.

The permeability and angle of loss characteristics of a ferrite of this kind have the form indicated in FIG. 11; while the permeability $\mu$ falls gradually at high frequencies, the angle of magnetic losses $$\tan^{-1}\delta = \frac{\mu''}{\mu'}$$

passes through a maximum value BM located at about 80 megacycles, for example.

The cable thus constituted has an attenuation characteristic in decibels per metre similar to that indicated at $A_3$ in FIG. 10.

FIG. 2 shows a cable comprising a textile braid 4 having a diameter of one millimetre, on which is coiled a wire 5 of copper having a diameter of $\%_{10}$ mm., a sheath 6 of 2.5 mm. in diameter having the composition No. 1 above, and an outer textile sheath 7. The attenuation characteristic is of the same order as that of the cable previously described ($A_3$—FIG. 10) but is referred to the developed length of the wire 5.

The cable of FIG. 3 comprises a textile braid 8 identical with the braid 4 of FIG. 2, a cylindrical core 9 having a diameter of 2.5 mm. made of the composition No. 1 above, a winding 10 of conducting wire and an external sheath 11 of woven fabric.

In accordance with one form of construction, the winding 10 is a copper wire; the attenuation curve remains similar to that indicated at $A_2$ in FIG. 10.

In accordance with a second form of construction, the winding 10 is formed by a wire of pure iron which has been subjected to a treatment known per se, forming in its surface texture zones of such size that its absorption band takes the form of the curve B of FIG. 11, with a maximum situated in the range from 20 to 200 megacycles. The attenuation curve of the cable then takes the shape of the curve $A_4$ of FIG. 10.

The known treatment which has just been referred to, for giving the desired dimensions to the magnetic zones is described for example in the following references:

C. Kittel: Physical Review 70, 1946, page 281;
Bozorth: Ferromagnetism—Bell Laboratories Series, p. 112 and the following;
J. Benoit, E. Naschke: Comptes rendus de l'Academie des Sciences, Paris, t. 238, p. 2292/2294, June 14, 1954.

In order to obtain the large "zones" necessary to obtain the maximum absorption in the band concerned, starting from a suitable alloy, it is necessary to carry out thermal treatmnets which consist in short of an annealing treatment of long duration accompanied by progressive reduction of the temperature. This treatment is carried out in a successive series of ovens at the output side of the wire-drawing apparatus.

In accordance with a third form of construction of the cable of FIG. 3, the winding 10 is constituted by a wire of iron-nickel-molybdenum alloy in the respective proportions of 50:49:1 percent. The performances are similar to those of the previous case.

The treatment referred to above is again applied in this case under similar conditions, if the performance of the cable is to be given its optimum value, that is to say if it is to have a substantial absorption upwards of about 20 megacycles for example.

The cable shown in FIG. 4 comprises a textile braid 12, similar to the braid 4 of FIG. 2, a core 13 having a diameter of 8.5 mm. and made from the following composition:

Composition No. 3

| | Percent |
|---|---|
| Vinyl | 20 |
| Ferrite Mn–Zn known under the name of "Ferroxcube 3B," a product of Ferroxcube Corporation of America of Saugerties, New York | 80 | a winding 14 of pure iron wire of $\%_{10}$ mm., with a space of $\%_{10}$ mm. between turns, a sheath 15 having an outer diameter of 5 mm. made from the composition No. 2 above, and an outer sheath 16 of polyvinyl, having an outer diameter of 6.5 mm. A cable formed in this way has an attenuation curve such as $A_5$ of FIG. 10, with an attenuation of the order of 80 decibels per metre at 100 megacycles.

The cable of FIG. 5 is similar to that of FIG. 4, with the addition of a screen 17 between the sheaths 15 and 16. The attenuation obtained with a cable of this kind exceeds 100 decibels per metre at frequencies upwards of about 50 megacycles.

FIG. 6 shows a two-conductor cable of a kind known per se for domestic or household applications, with two parallel conductors 21 and 22 in an insulating common sheath 23, having a thinner zone in the space between the two conductors. In accordance with the invention, this sheath may be composed of a material which has for example the composition No. 2 above.

FIG. 7 shows a cable of this kind connected between an electric razor 24 and the socket 25 for connection to the alternating current supply mains of the razor. In order to complete the protection of the radio-diffusion frequencies of the order of one megacycle, at which the attenuation obtained according to the invention may be insufficient, local capacities indicated at 26 and 27 may be arranged in known manner at the two ends of the cable, these being formed for example, by condensers of 50,000 pf.

FIG. 8 shows an anti-parasite cable for industrial applications with large outputs: this cable comprises two strands 31 and 32 of 10 copper wires of 0.3 mm. covered by a sheath 33 of a material having the composition No. 2 above, the whole being covered by a sheath 34 of textile braid.

The examples given above are obviously not restrictive but, on the contrary, lend themselves to a considerable number of alternative forms. It will further be noted with reference to FIG. 2, that by replacing the sheath 7 of textile braid by a sheath of metallic braid, there is obtained a coaxial cable with a high distributed capacity. By forming the winding 5 of a magnetic wire (treated pure iron or an iron-nickel-molybdenum alloy), the attenuation obtained in the band from 20 to 200 megacycles exceeds 100 decibels per metre.

Figure 9:
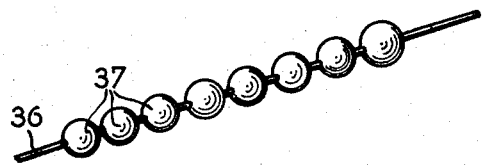
FIG. 9 shows a further type of cable with a single conductor.

In a further alternative form of single-conductor cable shown in FIG. 9, the absorbent medium formed about the conductor 36 is constituted by pearls 37 threaded on the cable; these pearls may be made of ferrite, of iron powder in an insulating support, etc.

A very large number of alternative forms, of the order of two hundred, may finally be obtained by the various possible combinations of the arrangements shown, namely:
Conductive wire:
Magnetic or non-magnetic,
Straight or coiled,
Single or double (bifilar or coaxial);
Sheath surrounding the wire:
With high magnetic losses,
With high dielectric losses,
With high magnetic and dielectric losses;
Supporting core in the case of coiled wire:
With high magnetic losses,
With high dielectric losses,
With high magnetic and dielectric losses;
In the case of a magnetic conductor wire: special treatment of the conductor itself;
Equipment of the cable with condensers forming local capacities, or construction in the form of coaxial cable with high distributed capacity.

The few concrete examples described above only serve to show the variety of the various combinations possible with or without the super-imposition of a number of sources of losses. On the other hand, while in the examples considered in detail reference has mainly been made to the loading of at least one part of the supporting medium of the conducting element of the cable with a material having a maximum of absorption due to resonance in the range from 80 to 200 megacycles, it is clear that the invention also includes the use of other materials capable of being set in magnetic and/or dielectric resonance and of causing substantial losses in all other ranges of frequencies both lower or higher.

With respect to the factors taken into consideration in obtaining dielectric mixtures such as composition No. 1, it may be noticed that high Debye relaxation losses in the 10 to 100 mc. range, and increasing up to 1000 mc., are responsible of the action of the neoprene which constitutes the bigger part of the mixture. The carbon powder introduces a certain conductivity, which, together with the granular structure of the Bakelite powder, introduces losses of the Maxwell-Wagner type (interface polarisation); this circumstance makes possible to extend the loss to the range of relatively low frequencies (broadcasting frequencies). This mixture is an example of a broadband attenuation insulating medium.

What I claim is:

1. A flexible cable capable of transmitting a range of low frequencies without substantial attenuation and of providing substantial absorption over a selected wide range of frequencies in the megacycle range, said flexible cable comprising at least one conducting element and at least one flexible insulating medium thereon, said insulating medium comprised of an intimate admixture of materials selected to have a frequency dependent electromagnetic wave attenuation due to absorption losses over said selected range of frequencies substantially as great as the attenuation caused by reactive effects of said mixture of materials, said absorption losses being produced by microscopic magnetic and/or dielectric resonance or relaxation within the mixture of materials.

2. A flexible cable capable of transmitting a range of low frequencies without substantial attenuation and of providing substantial absorption over a selected wide range of frequencies in the megacycle range, said flexible cable comprising at least one flexible conducting element and at least one flexible insulating medium thereon, said conducting element and said insulating medium each comprised of a mixture of materials selected to provide a cable having a frequency dependent electromagnetic wave impedance whose magnitude, due to absorption losses over said selected range of frequencies is substantially as great as the magnitude of the impedance due to reactive effects of said mixtures of materials, said absorption losses being produced by microscopic magnetic and/or dielectric resonance or relaxation within the mixtures of materials.

3. A high frequency cable as claimed in claim 1 in which said mixture of materials forming the insulating medium is composed of neoprene, carbon black and Bakelite.

4. A high frequency cable as claimed in claim 1 in which said mixture of materials forming the insulating medium is composed of 68% neoprene, carbon black 20% and Bakelite 10%.

5. A high frequency absorbing cable as claimed in claim 1 in which said mixture of materials forming the insulating medium is composed of rubber, carbon and a ferrite.

6. A high frequency absorbing cable as claimed in claim 1, in which said mixture of materials forming the insulating medium is composed of about 15% rubber, about 5% carbon, and about 80% ferrite.

7. A high frequency absorbing cable as claimed in claim 1 in which said mixture forming the insulating medium is composed of vinyl and a ferrite.

8. A high frequency absorbing cable as claimed in claim 1 in which said mixture forming the insulating medium is composed of about 20% vinyl and about 80% ferrite.

9. A high frequency absorbing cable as claimed in claim 2 in which the mixture of materials forming said insulating medium is composed of rubber, carbon and a ferrite, and in which the mixture forming said conducting element includes iron.

10. A high frequency absorbing cable as claimed in claim 2 in which the mixture forming said insulating medium comprises rubber, carbon and a ferrite, and in which the mixture forming said conducting element comprises an alloy of iron, nickel and molybdenum.

11. A high frequency absorbing cable as claimed in claim 2 in which the mixture forming said insulating medium is composed of vinyl and a ferrite, and in which the mixture forming said conducting element is composed of iron, nickel and molybdenum.

12. In a flexible cable capable of transmitting a range of low frequencies without substantial attenuation and of providing substantial absorption over a selected wide range of frequencies in the megacycle range, said flexible cable comprising one flexible conducting element and at least one flexible insulating medium therefor, said medium comprising a first alternating current energy absorbing material having an angle of loss whose tangent, given by the ratio of its resistive effect to its reactive effect, is substantially less than one in said megacycle range, the improvement comprising: a second energy absorbing particulate material in intimate admixture with said first material, said second material having a characteristic which increases the resistive absorption effect of said medium to cause said tangent to become greater than or equal to one in said megacycle range, so that the amplitude and frequency range of the absorption losses produced by said medium are increased by the presence of said second material.

13. A device as recited in claim 12 wherein said second material is comprised of ferromagnetic material capable of experiencing magnetic resonance or relaxation losses.

14. A device as recited in claim 12 wherein said second material comprises dielectric material capable of experiencing dielectric resonance or relaxation losses.

15. A device as recited in claim 12 wherein said conducting element has a spiral shape and surrounds at least a part of said insulating medium.

References Cited by the Examiner

UNITED STATES PATENTS

| | | | |
|---|---|---|---|
| 1,672,979 | 6/28 | Fondiller | 178—45 |
| 1,984,526 | 12/34 | Given | 123—148 |
| 2,228,797 | 1/41 | Wasserman | 178—45 |
| 2,238,915 | 4/41 | Peters | 333—79 |
| 2,402,049 | 6/46 | Ingalls | 123—148 |
| 2,443,109 | 6/48 | Linder | 333—79 |
| 2,594,890 | 4/52 | Ellwood | 333—79 |
| 2,622,152 | 12/52 | Rosch | 333—79 |
| 2,669,603 | 2/54 | Prache | 178—45 |
| 2,782,381 | 2/57 | Dyke | 333—79 |
| 2,790,053 | 4/57 | Peterson | 201—63 |
| 2,825,760 | 3/58 | Clogstron | 178—45 |
| 2,854,640 | 9/58 | Nordlin | 333—31 |
| 2,879,318 | 3/59 | Straube | 174—36 |
| 2,946,753 | 7/60 | Jonker | 252—62.5 |

OTHER REFERENCES

Gemant: Liquid Dielectrics, John Wiley, New York, 1933, QC-585-G33, page 83 cited.

Ragan: Microwave Transmission Circuits, vol. 9 of Radiation Laboratory Series TK 6553, McGraw-Hill, 1948, pages 27 to 29 cited.

Reggia: UHF Magnetic Attenuator, Radio-Electronic Engineering, April 1953, pages 12 to 14, 24.

HERMAN KARL SAALBACH, *Primary Examiner.*